(12) United States Patent
Couse

(10) Patent No.: US 8,333,919 B2
(45) Date of Patent: Dec. 18, 2012

(54) ELECTROLYTE SUPPORTED CELL DESIGNED FOR LONGER LIFE AND HIGHER POWER

(75) Inventor: Stephen Couse, Sunnyvale, CA (US)

(73) Assignee: Bloom Energy Corporation, Sunnyvale, CA (US)

(*) Notice: Subject to any disclaimer, the term of this patent is extended or adjusted under 35 U.S.C. 154(b) by 0 days.

(21) Appl. No.: 13/269,006

(22) Filed: Oct. 7, 2011

(65) Prior Publication Data
US 2012/0024461 A1    Feb. 2, 2012

Related U.S. Application Data

(62) Division of application No. 12/292,151, filed on Nov. 12, 2008, now Pat. No. 8,067,129.

(60) Provisional application No. 61/129,882, filed on Jul. 25, 2008, provisional application No. 61/129,759, filed on Jul. 17, 2008, provisional application No. 60/996,352, filed on Nov. 13, 2007.

(51) Int. Cl.
*C04B 33/32*    (2006.01)
(52) U.S. Cl. .................................. 264/618; 264/642
(58) Field of Classification Search ............ 264/618
See application file for complete search history.

(56) References Cited

U.S. PATENT DOCUMENTS

| | | | |
|---|---|---|---|
| 4,272,353 A | 6/1981 | Lawrance et al. | |
| 4,426,269 A | 1/1984 | Brown et al. | |
| 4,575,407 A | 3/1986 | Diller | |
| 4,686,158 A | 8/1987 | Nishi et al. | |
| 4,792,502 A | 12/1988 | Trocciola et al. | |
| 4,804,592 A | 2/1989 | Vanderborgh et al. | |
| 4,847,173 A | 7/1989 | Mitsunaga et al. | |
| 4,898,792 A | 2/1990 | Singh et al. | |
| 4,917,971 A | 4/1990 | Farooque | |
| 4,925,745 A | 5/1990 | Remick et al. | |
| 4,983,471 A | 1/1991 | Reichner et al. | |
| 5,034,287 A | 7/1991 | Kunz | |
| 5,047,299 A | 9/1991 | Shockling | |
| 5,143,800 A | 9/1992 | George et al. | |

(Continued)

FOREIGN PATENT DOCUMENTS

CN    1667860 A    9/2005

(Continued)

OTHER PUBLICATIONS

U.S. Appl. No. 13/268,233, "Electrolyte Supported Cell Designed for Longer Life and Higher Power," filed Oct. 7, 2011, Specification & Drawings, 30pgs.

(Continued)

*Primary Examiner* — Matthew Daniels
*Assistant Examiner* — Erin Snelting
(74) *Attorney, Agent, or Firm* — The Marbury Law Group PLLC

(57) ABSTRACT

A solid oxide fuel cell (SOFC) includes a cathode electrode, an anode electrode, and a solid oxide electrolyte located between the anode electrode and the cathode electrode. The cathode electrode is a porous ceramic layer infiltrated with a cathode catalyst material, and the anode electrode is a porous ceramic layer infiltrated with an anode catalyst material, and the electrolyte is a ceramic layer having a lower porosity than the anode and the cathode electrodes. A ceramic reinforcing region may be located adjacent to the riser opening in the electrolyte.

9 Claims, 11 Drawing Sheets

U.S. PATENT DOCUMENTS

| | | | |
|---|---|---|---|
| 5,169,730 | A | 12/1992 | Reichner et al. |
| 5,170,124 | A | 12/1992 | Blair et al. |
| 5,192,334 | A | 3/1993 | Rohr et al. |
| 5,273,837 | A | 12/1993 | Aitken et al. |
| 5,302,470 | A | 4/1994 | Okada et al. |
| 5,441,821 | A | 8/1995 | Merritt et al. |
| 5,445,903 | A | 8/1995 | Cable et al. |
| 5,498,487 | A | 3/1996 | Ruka et al. |
| 5,501,914 | A | 3/1996 | Satake et al. |
| 5,505,824 | A | 4/1996 | McElroy |
| 5,527,631 | A | 6/1996 | Singh et al. |
| 5,573,867 | A | 11/1996 | Zafred et al. |
| 5,589,285 | A | 12/1996 | Cable et al. |
| 5,601,937 | A | 2/1997 | Isenberg |
| 5,686,196 | A | 11/1997 | Singh et al. |
| 5,688,609 | A | 11/1997 | Rostrup-Nielsen et al. |
| 5,733,675 | A | 3/1998 | Dederer et al. |
| 5,741,605 | A | 4/1998 | Gillett et al. |
| 5,922,488 | A | 7/1999 | Marucchi-Soos et al. |
| 5,955,039 | A | 9/1999 | Dowdy |
| 6,013,385 | A | 1/2000 | DuBose |
| 6,051,125 | A | 4/2000 | Pham et al. |
| 6,106,964 | A | 8/2000 | Voss et al. |
| 6,228,521 | B1 | 5/2001 | Kim et al. |
| 6,238,816 | B1 | 5/2001 | Cable et al. |
| 6,280,865 | B1 | 8/2001 | Eisman et al. |
| 6,329,090 | B1 | 12/2001 | McElroy et al. |
| 6,403,245 | B1 | 6/2002 | Hunt |
| 6,428,920 | B1 | 8/2002 | Badding et al. |
| 6,436,562 | B1 | 8/2002 | DuBose |
| 6,451,466 | B1 | 9/2002 | Grasso et al. |
| 6,489,050 | B1 | 12/2002 | Ruhl et al. |
| 6,558,831 | B1 | 5/2003 | Doshi et al. |
| 6,623,880 | B1 | 9/2003 | Geisbrecht et al. |
| 6,677,070 | B2 | 1/2004 | Kearl |
| 6,682,842 | B1 | 1/2004 | Visco et al. |
| 6,821,663 | B2 | 11/2004 | McElroy et al. |
| 6,835,488 | B2 | 12/2004 | Sasahara et al. |
| 6,854,688 | B2 | 2/2005 | McElroy et al. |
| 6,924,053 | B2 | 8/2005 | McElroy et al. |
| 7,014,934 | B2 * | 3/2006 | Novak ............ 429/456 |
| 7,045,237 | B2 | 5/2006 | Sridhar et al. |
| 7,045,239 | B2 | 5/2006 | Donelson et al. |
| 7,150,927 | B2 | 12/2006 | Hickey et al. |
| 7,255,956 | B2 | 8/2007 | McElroy |
| 7,968,245 | B2 | 6/2011 | Gottmann |
| 2001/0049035 | A1 | 12/2001 | Haltiner, Jr. et al. |
| 2002/0028362 | A1 | 3/2002 | Prediger et al. |
| 2002/0028367 | A1 | 3/2002 | Sammes et al. |
| 2002/0058175 | A1 | 5/2002 | Ruhl |
| 2002/0076593 | A1 | 6/2002 | Helfinstine et al. |
| 2002/0098406 | A1 | 7/2002 | Huang et al. |
| 2002/0106544 | A1 | 8/2002 | Noetzel et al. |
| 2002/0127455 | A1 | 9/2002 | Pham et al. |
| 2002/0132156 | A1 | 9/2002 | Ruhl |
| 2003/0059668 | A1 | 3/2003 | Visco et al. |
| 2003/0162067 | A1 | 8/2003 | McElroy |
| 2003/0165732 | A1 | 9/2003 | McElroy |
| 2003/0196893 | A1 | 10/2003 | McElroy |
| 2004/0081859 | A1 | 4/2004 | McElroy et al. |
| 2004/0115503 | A1 | 6/2004 | Jacobson et al. |
| 2004/0191595 | A1 | 9/2004 | McElroy et al. |
| 2004/0191597 | A1 | 9/2004 | McElroy |
| 2004/0191598 | A1 | 9/2004 | Gottmann et al. |
| 2004/0202914 | A1 | 10/2004 | Sridhar et al. |
| 2004/0224193 | A1 | 11/2004 | Mitlitsky et al. |
| 2005/0048334 | A1 | 3/2005 | Sridhar et al. |
| 2006/0008682 | A1 | 1/2006 | McLean et al. |
| 2006/0040168 | A1 | 2/2006 | Sridhar |
| 2006/0057295 | A1 | 3/2006 | Visco et al. |
| 2006/0166070 | A1 | 7/2006 | Hickey et al. |
| 2006/0234100 | A1 | 10/2006 | Day et al. |
| 2007/0006561 | A1 | 1/2007 | Brady et al. |
| 2007/0287048 | A1 | 12/2007 | Couse et al. |
| 2008/0076006 | A1 | 3/2008 | Gottmann et al. |
| 2008/0096080 | A1 | 4/2008 | El Batawi et al. |
| 2008/0193825 | A1 | 8/2008 | Nguyen et al. |
| 2008/0254336 | A1 | 10/2008 | El Batawi |

FOREIGN PATENT DOCUMENTS

| | | |
|---|---|---|
| WO | WO 2004/093214 | 10/2004 |
| WO | 2005/057685 A2 | 6/2005 |

OTHER PUBLICATIONS

W. D. Callister, Jr., Materials Science and Engineering, $5^{th}$ Edition, 1999, pp. 407-411.

Cell and Stack Construction: Low-Temperature Cells, L.G. Austin, NASA SP-120, 1967.

EG & G Services, Parsons, Inc., SAIC, Fuel Cell Handbook, $5^{th}$ Edition, UDDOE. Oct. 2000. pp. 9-1-9-4, and 9-12-9-14.

J.M. Sedlak, J. F. Austin and A. B. LaConti, "Hydrogen Recovery and Purification Using the Solid Polymer Electrolyte Electrolysis Cell," Int. J. Hydrogen Energy, vol. 6, pp. 45-51. (1981).

Low Cost Reversible Fuel Cell System, Proceedings of the 2000 U.S. DOE Hydrogen Program Review, Jun. 15, 2000, NREL/CP-570-28890.

Low Cost, Compact Solid Oxide Fuel Cell Generator, NASA Small Business Innovation Research Program.

Low Cost, High Efficiency Reversible Fuel Cell (and Electrolyzer) Systems, Proceedings of the 2001 DOE Hydrogen Program Review NREL/CP-570-30535.

Low Cost, High Efficiency Reversible Fuel Cell Systems, Proceedings of the 2002 U.S. DOE Hydrogen Program Review, NREL/CP-610-32405.

Power Generation and Steam Electrolysis Characteristics of an Electrochemical Cell with a Zirconia- or Ceria-based Electrode, K. Eguchi, et al, Solid State Ionics, 86 88 (1996) 1245-1249.

Regenerative Fuel Cells for High Altitude Long Endurance Solar Powered Aircraft, F. Mitlitsky, et al, $28^{th}$ Intersociety Energy Conversion Engineering Conference (IECEC), Jul. 28, 1993, UCRL-JC-113485.

Small, Ultra Efficient Fuel Cell Systems, Advanced Technology Program ATP 2001 Competition (Jun. 2002).

S. Park et al., Direct oxidation of hydrocarbons in a solid-oxide fuel cell, Letters to Nature, Mar. 2000, vol. 404, pp. 265-267.

S. Park et al., Tape Cast Solid Oxide Fuel Cells for the Direct Oxidation of Hydrocarbons, Journal of the Electrochemical Society, 2001, vol. 148, No. 5, pp. A443-A447.

Unitized Regenerative Fuel Cells for Solar Rechargeable Aircraft and Zero Emission Vehicles, F. Mitlitsky, et al, 1994 Fuel Cell Seminar, Sep. 6, 1994, UCRL-JC-117130.

Search Report & Written Opinion dated Oct. 6, 2009 for International Patent Application No. PCT/US2008/012671.

Office Action issued in Chinese Application No. 200880115166.0, mailed Jul. 11, 2012.

* cited by examiner

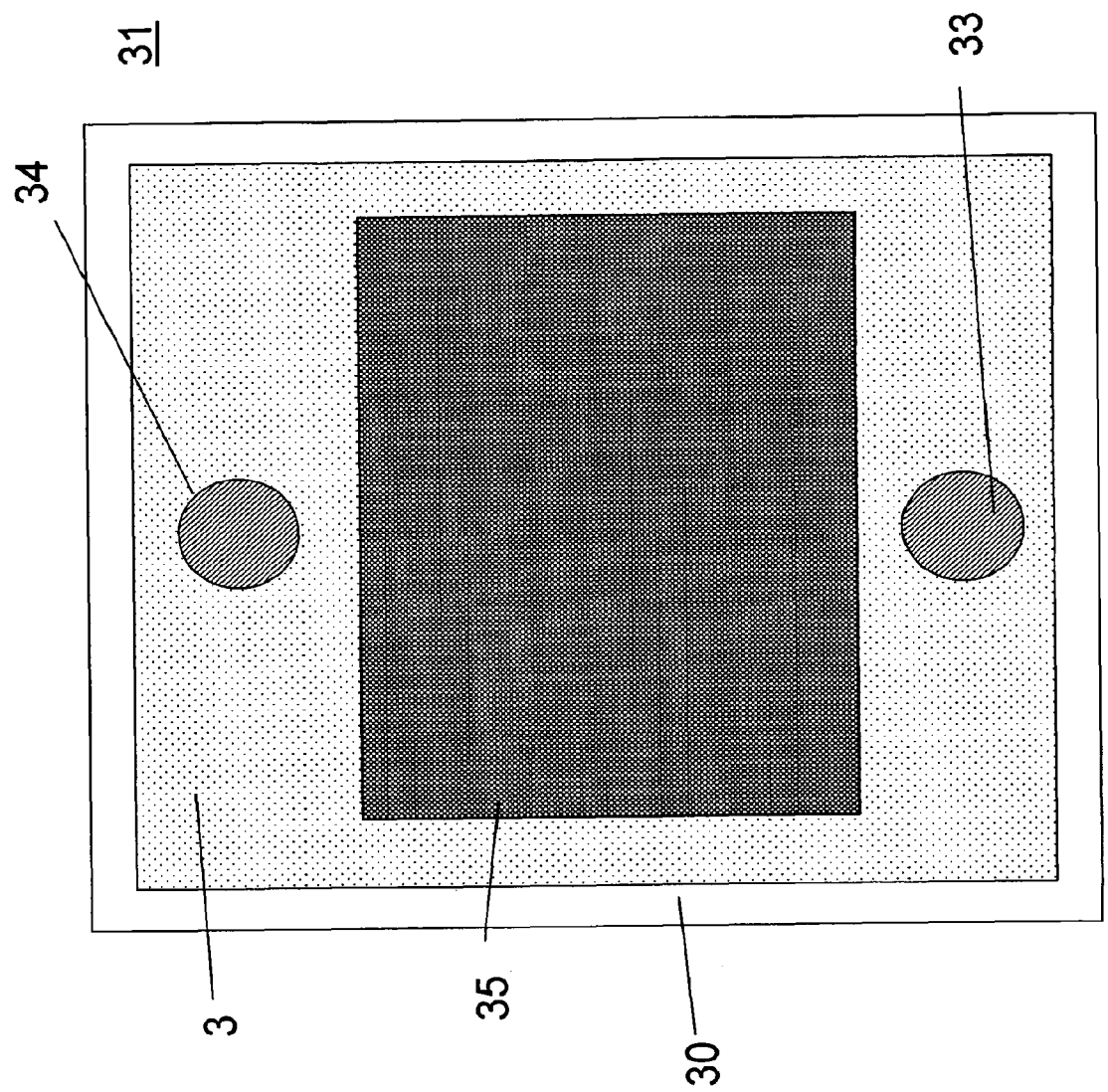

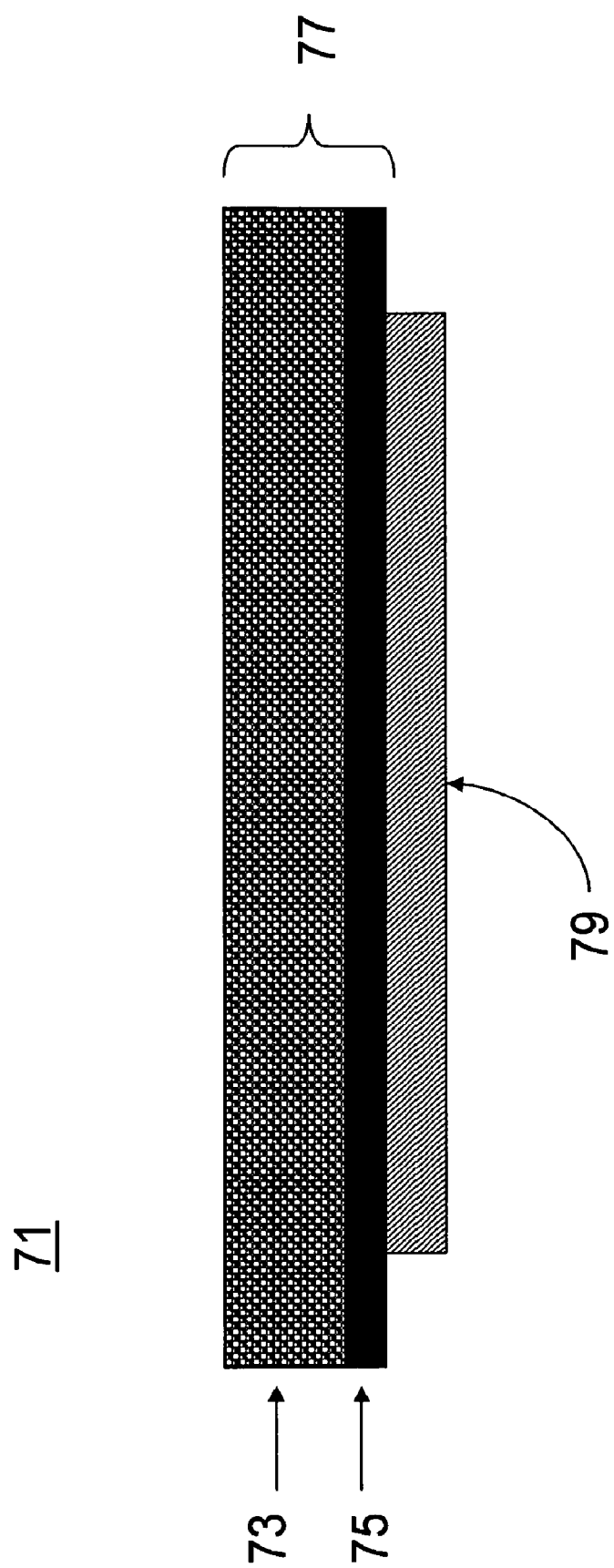

ELECTROLYTE SUPPORTED CELL DESIGNED FOR LONGER LIFE AND HIGHER POWER

The present application is a divisional of U.S. application Ser. No. 12/292,151, filed on Nov. 12, 2008, which claims benefit of U.S. Provisional Application Ser. Nos. 60/996,352 filed Nov. 13, 2007, 61/129,759 filed Jul. 17, 2008 and 61/129,882 filed Jul. 25, 2008, which are hereby incorporated by reference in their entirety.

BACKGROUND OF THE INVENTION

The present invention is generally directed to fuel cell components, and to solid oxide fuel cell materials in particular.

Fuel cells are electrochemical devices which can convert energy stored in fuels to electrical energy with high efficiencies. Electrolyzer cells are electrochemical devices which can use electrical energy to reduce a given material, such as water, to generate a fuel, such as hydrogen. The fuel and electrolyzer cells may comprise reversible cells which operate in both fuel cell and electrolysis mode.

In a high temperature fuel cell system, such as a solid oxide fuel cell (SOFC) system, an oxidizing flow is passed through the cathode side of the fuel cell, while a fuel flow is passed through the anode side of the fuel cell. The oxidizing flow is typically air, while the fuel flow can be a hydrocarbon fuel, such as methane, natural gas, propane, ethanol, or methanol. The fuel cell, operating at a typical temperature between 750° C. and 950° C., enables combination of the oxygen and free hydrogen, leaving surplus electrons behind. The excess electrons are routed back to the cathode side of the fuel cell through an electrical circuit completed between anode and cathode, resulting in an electrical current flow through the circuit.

Fuel cell stacks may be either internally or externally manifolded for fuel and air. In internally manifolded stacks, the fuel and air is distributed to each cell using risers contained within the stack. In other words, the gas flows through openings or holes in the supporting layer of each fuel cell, such as the electrolyte layer, and gas separator of each cell. In externally manifolded stacks, the stack is open on the fuel and air inlet and outlet sides, and the fuel and air are introduced and collected independently of the stack hardware. For example, the inlet and outlet fuel and air flow in separate channels between the stack and the manifold housing in which the stack is located.

Typically, SOFC are fabricated either as electrolyte supported, anode supported, or cathode supported, depending on which of the three functional components of the cell provides structural support. In planar electrolyte supported SOFC designs, the anode and cathode electrodes are painted as an ink onto the opposite surfaces of a planar ceramic electrolyte. However, weakness in structural integrity, particularly at or around the fuel inlet and outlet riser openings, might arise in these designs under certain loading conditions.

Ceramics are known to exhibit fracture before any plastic deformation can occur in response to an applied tensile load, such as during thermal cycling. Fracture in ceramics usually originates at preexisting defects, such as microcracks, internal pores, and grain corners. Fracture strength depends on the probability of the existence of a defect that is capable of initiating a crack. WILLIAM D. CALLISTER, JR., MATERIALS SCIENCE AND ENGINEERING, 5$^{th}$ Ed. (1999), pages 407-409. For two ceramic samples containing identical defect densities, it is known that specimen size and volume influences fracture strength: "the larger the specimen, the greater this flaw existence probability, and the lower the fracture strength." CALLISTER, at 408.

SUMMARY OF THE INVENTION

A solid oxide fuel cell (SOFC) comprises a cathode electrode, an anode electrode, and a solid oxide electrolyte located between the anode electrode and the cathode electrode. The cathode electrode comprises a porous ceramic layer infiltrated with a cathode catalyst material, the anode electrode comprises a porous ceramic layer infiltrated with an anode catalyst material and the electrolyte comprises a ceramic layer having a lower porosity than the anode and the cathode electrodes.

Another aspect of the invention provides a SOFC which includes an anode electrode, a cathode electrode, and a solid oxide electrolyte located between the anode electrode and the cathode electrode. The anode electrode or the cathode electrode comprises a porous first ceramic layer infiltrated with an anode material or a cathode material, and the electrolyte comprises a second ceramic layer having a lower porosity than the first ceramic layer.

Another aspect of the present invention provides a solid oxide fuel cell (SOFC) includes a ceramic electrolyte having at least one fuel inlet or outlet riser opening, an anode contacting the electrolyte on a first side of the electrolyte, a cathode contacting the electrolyte on a second side opposite the first side, and a ceramic reinforcing region that is located at least partially around a circumference of the riser opening.

Another aspect of the invention provides a method of making a hole-reinforced electrolyte, comprising providing a ceramic reinforcing region at least partially around a circumference of a riser opening in a ceramic electrolyte, and sintering the ceramic reinforcing region.

BRIEF DESCRIPTION OF THE DRAWINGS

FIGS. 4C and 5 illustrates a top view of the anode electrode of a SOFC of the embodiments of the invention.

FIG. 7 illustrates a side cross-sectional view of a SOFC according to an embodiment of the invention in which one of the electrodes comprises a porous ceramic layer.

DETAILED DESCRIPTION OF THE EMBODIMENTS

In one embodiment of the invention, only the electrode provides structural support for the cell. The anode and cathode electrodes comprise inks painted or screen printed onto the ceramic electrolyte, such as a stabilized zirconia and/or doped ceria, such as yttria stabilized zirconia ("YSZ"), scandia stabilized zirconia ("SCZ"), gadolinia doped ceria ("GDC") and/or samaria doped ceria ("SDC") electrolyte. In another embodiment of the invention, both electrodes and the electrolyte provide structural support for the fuel cell. This provides a higher strength for each cell and allows a thinner and/or larger footprint electrolyte while lowering the cost for electrolyte production. The dense electrolyte layer is located between two catalyst infiltrated electrode layers which have a higher porosity than the electrolyte layer. The electrolyte may be considered "non-porous" because the porosity of the electrolyte is lower than that of the electrodes and should be sufficiently low to prevent the electrode catalyst from infiltrating through the thickness of the electrolyte. However, it should be noted that as a ceramic material, the electrolyte contains a certain amount of porosity. While closed pores are allowed within the electrolyte because they do not have any connection with the surface, the amount of open porosity should be minimized. Preferably, the porosity limit is such that the permeability is low enough to avoid significant reaction of fuel and oxidizer without the flow of ions and that the permeability is low enough to maintain certain spatial separation between electrodes.

In one embodiment, the two outer electrode layers and the middle electrolyte layer are made of the same ceramic material, such as a stabilized zirconia. In another embodiment, the outer porous electrode layers are made of a different ceramic material from that of the electrolyte. The electrode layers may be made of the same or different ceramic material from each other. In either case, they are infiltrated with a different respective anode and cathode catalyst material. In yet another embodiment, ceramic interlayers and/or a non-continuous outer layer is added to the fuel cell to provide reinforcement, thereby providing additional mechanical strength to the fuel cell.

While the electrode catalysts are described above as being preferably produced by infiltration into a porous ceramic layer, the fuel cells may be made by any suitable methods. Furthermore, while stabilized zirconias, such as yttria, scandia and/or ceria stabilized zirconia, and doped cerias, such as samaria doped ceria, are preferred as the ceramic materials for the electrodes and/or electrolyte layers, other suitable ceramic materials may be used instead.

Figure 1:
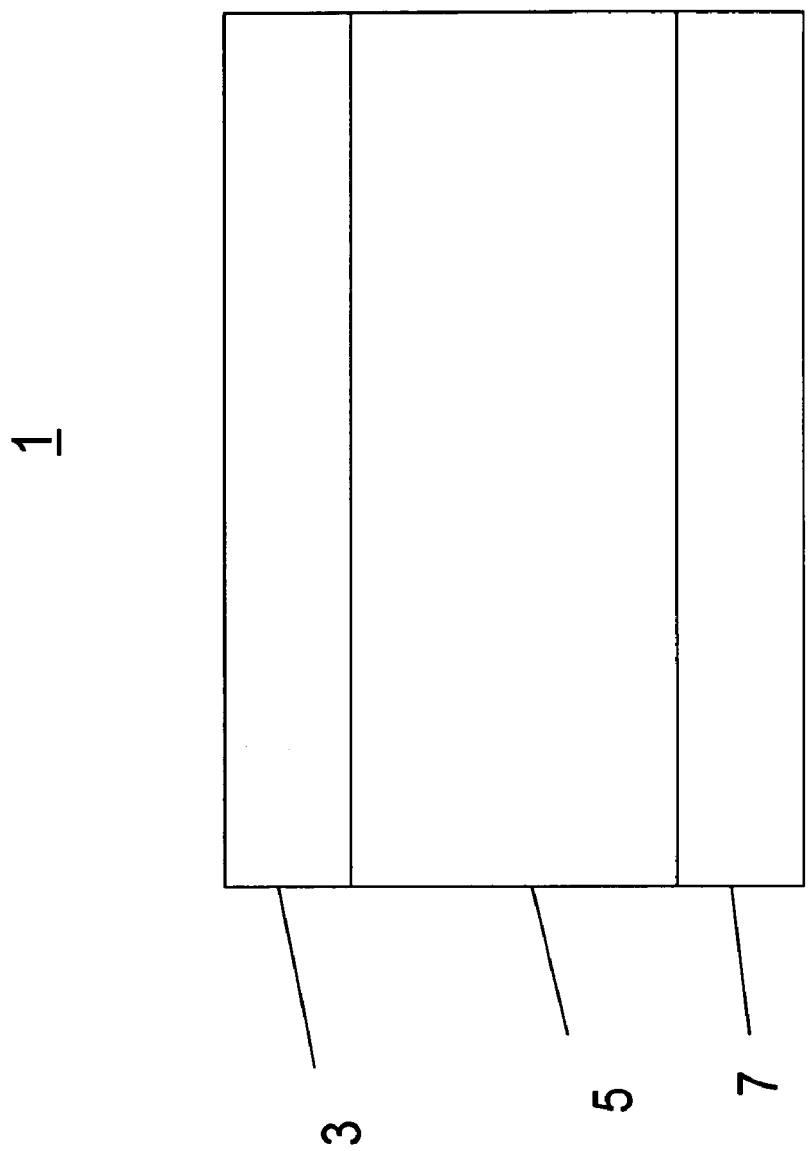
FIG. 1 illustrates a side cross-sectional view of a SOFC of the embodiments of the invention, where the porous outer electrode layers and the middle electrolyte layer comprise the same material.

FIG. 1 illustrates a solid oxide fuel cell (SOFC) 1 according to a first embodiment of the invention. The fuel cell 1 includes a porous anode electrode 3, a dense solid oxide electrolyte 5 and a porous cathode electrode 7. In this embodiment, the electrode layers 3, 7 and the electrolyte layer 5 are made of the same ceramic material, such as a stabilized zirconia, such as yttria stabilized zirconia ("YSZ"), scandia stabilized zirconia ("SSZ"), scandia ceria stabilized zirconia ("SCSZ") (which can also be referred to as scandium and cerium doped zirconia), or mixtures thereof. In one example, the electrolyte 5 and the electrodes 3, 7 may comprise YSZ or SSZ, such as 8 molar YSZ (i.e., 8 molar percent yttria/92 molar percent zirconia composite) or 8 molar percent SSZ; 10 molar or 11 molar percent SSZ can also be used. In another example, the electrolyte and the electrodes may comprise scandia ceria stabilized zirconia (SCSZ), such as 10 molar scandia 1 molar ceria stabilized zirconia. In another embodiment, the electrolyte may be a doped ceria material, such as gadolinia doped ceria (GDC). The anode and cathode catalysts are infiltrated into the porous electrodes 3, 7, respectively, with precursors that comprise salts or metal-organics dissolved in a solvent, or molten metal salts. The ratio of the salts, and hence the ratio of metal cations, in solution is such to form the desired catalyst phase upon heating and reactions of the components. The precursors can be heated in an oxidizing atmosphere in order to form oxides, or heated and reacted in a reducing atmosphere resulting in metal phases. In a reduced state, the anode electrode catalyst may comprise nickel, such as pure nickel or an alloy of nickel and another metal, such as copper. This catalyst is in a form of nickel oxide when it is in an oxidized state. Thus, the anode catalyst may be infiltrated as nickel oxide, and the anode electrode is then subsequently annealed in a reducing atmosphere prior to operation to reduce the nickel oxide to nickel. The cathode electrode catalyst may comprise an electrically conductive perovskite material, such as lanthanum strontium manganite (LSM). Other conductive perovskites having a general formula $(La_xSr_{1-x})(Mn_yA_{1-y})O_3$ where A is Cr and/or Co, $0.6<x<0.9$, $0y<0.4$ or $(La_xD_{1-x})(E_yG_{1-y})O_3$ where D is Sr or Ca, and E and G are one or more of Fe, Co, Mn, and Cr ($0.6<x<0.9$, $0y\leq0.4$), including LSCr, LSCo, etc., or noble metals, such as Pt, may also be used.

Figure 2:
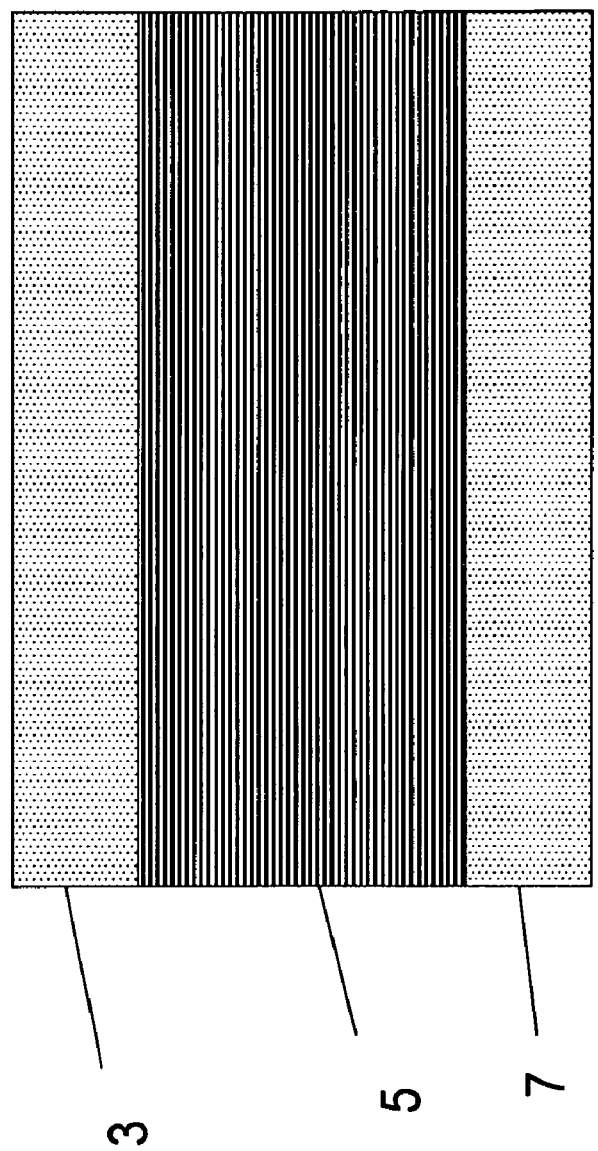
FIG. 2 illustrates a side cross-sectional view of a SOFC of the embodiments of the invention, where the porous outer electrode layers and the middle electrolyte layer comprise different materials.

FIG. 2 illustrates a SOFC 11 according to a second embodiment of the invention. The cell 11 includes a porous anode electrode 3, a dense solid oxide electrolyte 5 and a porous cathode electrode 7. Electrodes 3 and 7 are made of a different material from that of the electrolyte 5. Electrodes 3 and 7 may be made from the same or different material as each other. Electrolyte 5 may be made of a highly ionically conductive material, such as SSZ, while electrodes 3 and 7 may be made of a higher strength, lower ionic conductivity material, such as YSZ. For example, 3 molar percent yttria YSZ (3YSZ) is used for the electrodes 3, 7. Alternatively, 4 molar percent yttria YSZ (4YSZ) is used to avoid the problems associated with phase transitions of 3YSZ. In general, YSZ compositions having more than 3 molar percent yttria, such as 3 to 10 molar percent yttria, for example 5 to 10 molar percent yttria (i.e., $(ZrO_2)_{1-z}(Y_2O_3)_z$, where $0.03\leq z\leq0.1$), may be used.

Preferably, the scandia stabilized zirconia for the electrolyte 5 has the following formula: $[(ZrO_2)_{1-y}(CeO_2)_y]_{1-x}(Sc_2O_3)_x$, where $0.06\leq x\leq0.11$ and $0\leq y\leq0.01$. While a stoichiometric stabilized zirconia is described by the formula, a non-stoichiometric stabilized zirconia having more or less than two oxygen atoms for each metal atom may be used. For example, the electrolyte may comprise SCSZ having 1 molar percent ceria and 10 molar percent scandia (i.e., $[(ZrO_2)_{1-y}(CeO_2)_y]_{1-x}(Sc_2O_3)_x$ where x=0.1 and y=0.01). The ceria in SCSZ may be substituted with other ceramic oxides. Thus, alternative scandia stabilized zirconias can be used, such as scandia yttria stabilized zirconia ("SYSZ"), which can also be referred to as scandium and yttrium doped zirconia, and scandia alumina stabilized zirconia ("SAlSZ"), which can also be referred to as scandium and aluminum doped zirconia. The yttria or alumina may comprise 1 molar percent or less in the scandia stabilized zirconia.

Figure 3:
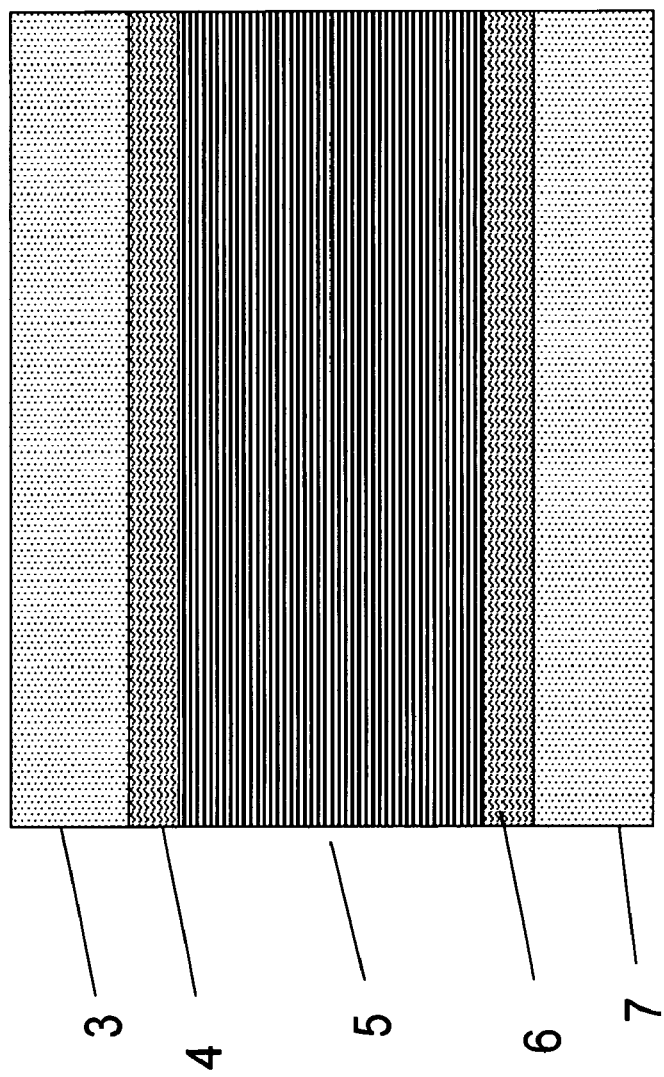
FIG. 3 illustrates a side cross-sectional view of a SOFC of the embodiments of the invention, where an additional ceramic layer is located between each electrode and the electrolyte.

The number of layers in the SOFC need not be restricted to three. FIG. 3 illustrates a SOFC 21 according to the third embodiment. In this embodiment, one additional interlayer layer 4 is located between the electrolyte 3 and anode 5, and another interlayer 6 is located between the electrolyte 5 and cathode 7. If desired, only one of the layers 4, 6 may be used in the SOFC 21. Materials such as doped ceria, which can enhance redox stability of the cell and further reduce the usage of expensive materials, may be used to fabricate the interlayers 4, 6. Samaria, gadolinia or yttria doped ceria (in other words, the ceria may contain Sm, Gd and/or Y dopant element which forms an oxide upon incorporation into the ceria) may be used as the interlayer 4, 6 material. Preferably, the doped ceria phase composition comprises $Ce_{(1-x)}A_xO_2$, where A comprises at least one of Sm, Gd, or Y, and x is greater than 0.1 but less than 0.4. For example, x may range from 0.15 to 0.3 and may be equal to 0.2. The materials for the electrodes 3, 7 and electrolyte 5 may be the same as those described above with respect to the first and the second embodiments.

It is desirable that all layers 3, 4, 5, 6, 7 be as thin as possible. The thickness of the layers can be optimized to provide desired electrical and mechanical properties. For example, the middle electrolyte layer 5 should be at least 5 microns thick, such as about 25 to about 75 microns thick, while the thickness of the outer porous electrode layers 3, 7 can be between about 20 to about 100 microns. If the sintering properties of the three layers 3, 5, 7 are adjusted appropriately, then the thicknesses of the three layer cell can be asymmetric. The anode porous layer 3 may be thinner than the cathode layer 7 to allow high fuel utilization at the anode while the cathode can be kept thicker because air utilization is generally much less critical. For example, the anode layer 3 may be about 20 to about 50 microns thick while the cathode layer 7 may be about 50 to about 100 microns thick. For a five layer cell 21 shown in FIG. 3, the electrodes 3, 7 may be about 20 to about 100 microns thick, the electrolyte 5 may be 5 to 30 microns thick and the interlayers 4, 6 may be 5 to 20 microns thick. For example, the structure of cell 21 may comprise a 50 micron thick anode electrode 3 comprising 3YSZ or 4YSZ infiltrated with Ni or nickel oxide catalyst, a 10 micron thick doped ceria (such as SDC) interlayer 4, a 10 micron thick SSZ electrolyte 5, 10 micron thick doped ceria (such as SDC) interlayer 6, and a 50 micron thick cathode electrode 7 comprising 3YSZ or 4YSZ infiltrated with LSM or Pt catalyst. If desired, the anode electrode 3 may comprise a functionally graded electrode containing a first portion and a second potion, such that the first portion is located between the electrolyte 5 and the second portion. The first portion of the anode electrode contains a lower porosity and a lower ratio of the nickel containing catalyst to the ceramic matrix than the second portion of the anode electrode, as described in U.S. Provisional Patent Application Ser. No. 60/852,396 filed on Oct. 18, 2006, which is incorporated by reference in its entirety. For example, the first portion of the anode electrode may contain a porosity of 5-30 volume percent and a nickel phase content of 1 to 20 volume percent. The second portion of the anode electrode may contain a porosity of 31 to 60 volume percent and a nickel phase content of 21 to 60 volume percent. The first and second portions of the anode electrode may comprise two or more separate sublayers or the porosity and nickel content may be graded continuously or in steps along the anode electrode 3 thickness.

Figure 4A:
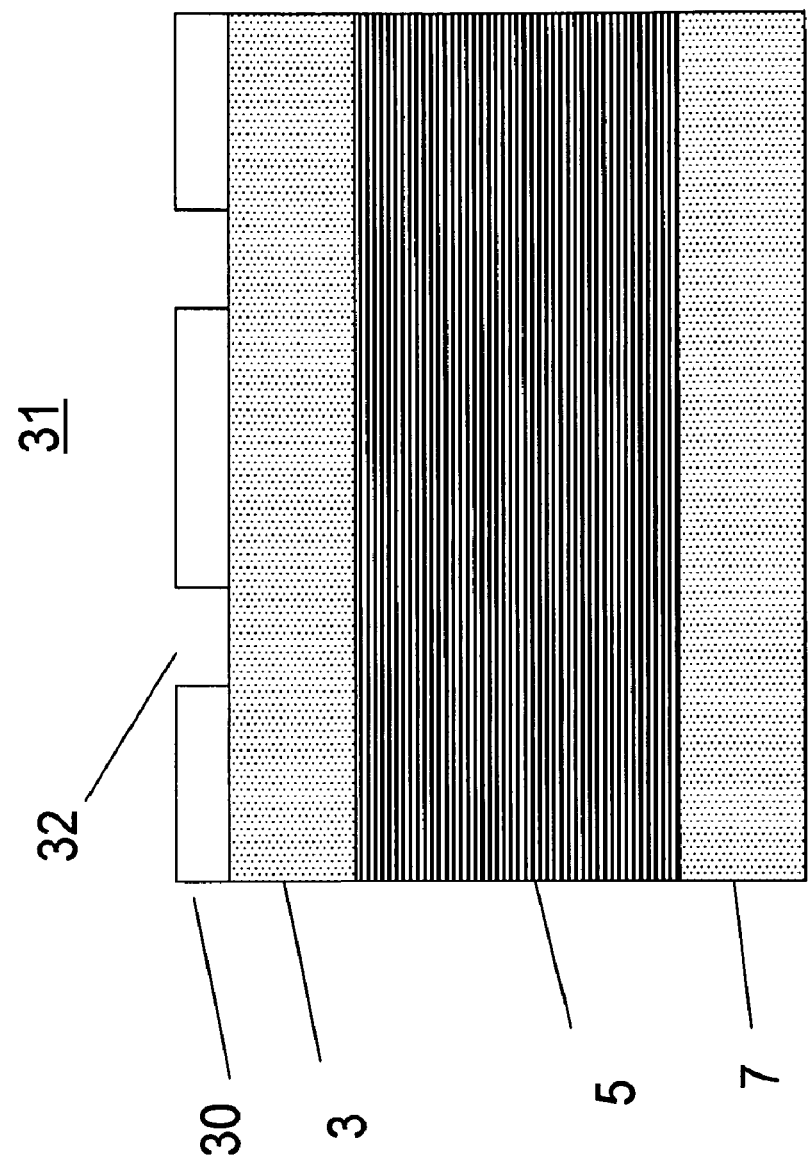
FIG. 4A illustrates a side cross-sectional view of a SOFC of the embodiments of the invention, where a non-continuous outer layer is added to the SOFC.
Figure 4B:
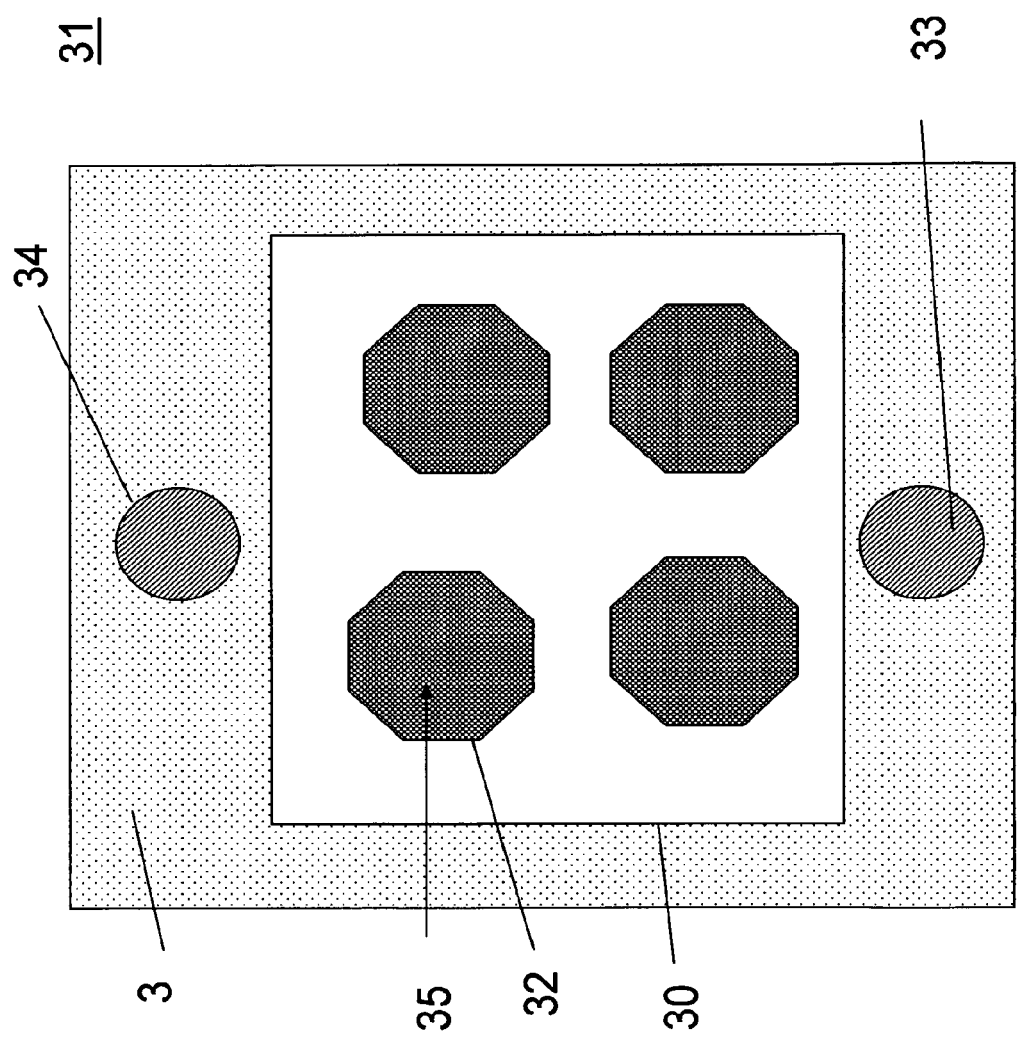
FIG. 4B illustrates a top view of the SOFC of FIG. 4A.

In another embodiment, a non-continuous outer or support layer 30 is added to the SOFC 31. One such embodiment is illustrated in FIGS. 4A and 4B, where the outer layer 30 comprises a sheet with hexagonal holes 32 exposing the underlying electrode 3 or 7. However, the holes 32 may have shapes other than hexagonal, such as rectangular, square, oval, circular, irregular, etc. The outer layer 30 may be 50 to 200 microns thick. The outer or support layer 30 may comprise any strong ceramic material, such as YSZ, SSZ or a doped ceria, which can be sintered and are compatible with the electrodes. The outer or support layer 30 may be located adjacent to the cathode electrode 7 or adjacent to the anode electrode 3. If desired, two support layers may be provided, one adjacent to the anode and the other one adjacent to the cathode electrode.

FIG. 4B shows a top view of a cell 31 which is internally manifolded for fuel and externally manifolded for air. Hence, the cell contains internal fuel inlet 33 and outlet 34 riser openings. However, the cell 31 may be internally and/or externally manifolded for fuel and/or air as desired. The addition of the outer layer results in a reinforced structure, rendering additional mechanical strength to the cell and allowing the other layers to be sized to their electrochemical ideal thickness.

If the outer layer or layers 30 are located outside the electrochemically active area (referred to as a peripheral area), as shown in FIG. 4C, then even ionically non-conductive materials can be used for layer 30, such as a zirconia toughened alumina, which is an inexpensive, high-strength material. In FIGS. 4B and 4C, only the central or active portion 35 of the porous layer 3 is infiltrated with a catalyst to form the electrode of the cell. The peripheral areas, such as areas adjacent to the riser openings 33 and 34, may remain uninfiltrated with the catalyst. Alternatively, the entire plane of the porous layers may be infiltrated with a catalyst material.

Figure 5:
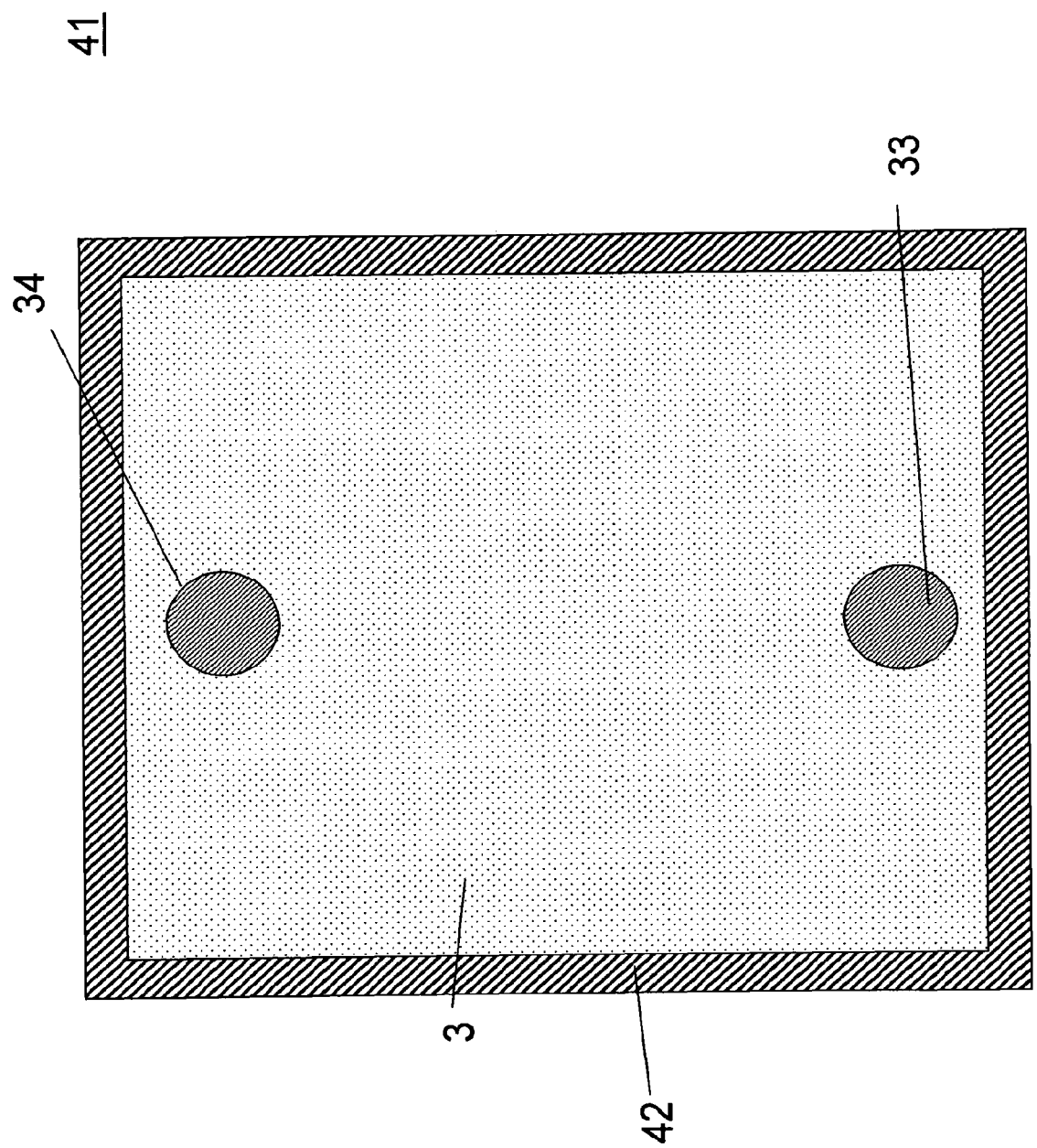

If desired, a seal may be formed around the periphery of the porous layer(s) 3, 7 and/or around the riser openings (if present). As shown in FIG. 5, when the porous layer 3, 7 extends to the edge of the cell 41, the porous layer outside the active region near the edge or periphery of the cell may be filled with ceramic, glass, or a glass ceramic mixture to form a seal 42 to eliminate the potential problem arising from the interaction between the fuel and ambient air in or next to the pores. Alternatively, an edge seal may be used where the glass is allowed to flow over the thin outer edge of the electrolyte to form the seal. Alternatively, the nonporous middle electrolyte layer 5 can laterally extend past the porous layer(s) 3, 7 and be folded over the edge of the porous layer 3 or 7 to form the seal 42. Preferably, layer 5 is folded over the anode electrode layer 3 to form the seal. The folded seal may be used in combination with the filled pore type seal or with a conventional glass composite layer type of seal.

Figure 6:
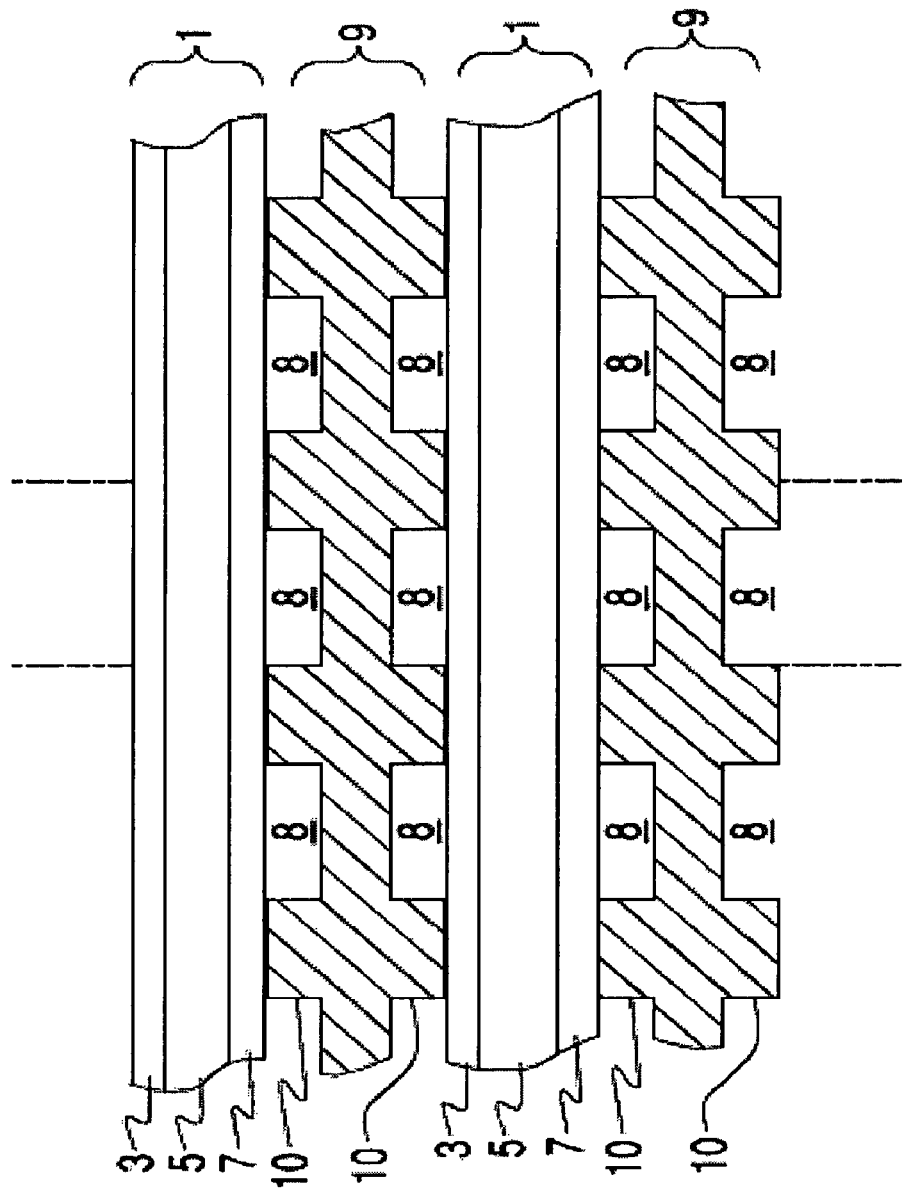
FIG. 6 illustrates a side cross sectional view of a SOFC stack of an embodiment of the invention.

Fuel cell stacks are frequently built from a multiplicity of SOFC's in the form of planar elements, tubes, or other geometries. Fuel and air has to be provided to the electrochemically active surface, which can be large. As shown in FIG. 6, one component of a fuel cell stack is the so called gas flow separator (referred to as a gas flow separator plate in a planar stack) 9 that separates the individual cells in the stack. The gas flow separator plate separates fuel flowing to the fuel electrode (i.e. anode 3) of one cell in the stack from oxidant, such as air, flowing to the air electrode (i.e. cathode 7) of an adjacent cell in the stack. The fuel may be a hydrocarbon fuel, such as natural gas for internally reforming cells, or a reformed hydrocarbon fuel comprising hydrogen, water vapor, carbon monoxide and unreformed hydrocarbon fuel for externally reforming cells. The separator 9 contains gas flow passages or channels 8 between the ribs 10. Frequently, the gas flow separator plate 9 is also used as an interconnect which electrically connects the fuel electrode 3 of one cell to the air electrode 7 of the adjacent cell. In this case, the gas flow separator plate which functions as an interconnect is made of or contains electrically conductive material, such as a Cr—Fe alloy. An electrically conductive contact layer, such as a nickel contact layer or mesh, may be provided between the anode electrode and the interconnect. A conductive ceramic paste, such as LSM paste, may be provided between the cathode electrode and the next adjacent interconnect of the stack. FIG. 6 shows that the lower SOFC 1 is located between two gas separator plates 9.

Furthermore, while FIG. 6 shows that the stack comprises a plurality of planar or plate shaped fuel cells, the fuel cells may have other configurations, such as tubular. Still further, while vertically oriented stacks are shown in FIG. 6, the fuel cells may be stacked horizontally or in any other suitable direction between vertical and horizontal.

The term "fuel cell stack," as used herein, means a plurality of stacked fuel cells which share a common fuel inlet and exhaust passages or risers. The "fuel cell stack," as used herein, includes a distinct electrical entity which contains two end plates which are connected to power conditioning equipment and the power (i.e., electricity) output of the stack. Thus, in some configurations, the electrical power output from such a distinct electrical entity may be separately controlled from other stacks. The term "fuel cell stack" as used herein, also includes a part of the distinct electrical entity. For example, the stacks may share the same end plates. In this case, the stacks jointly comprise a distinct electrical entity. In this case, the electrical power output from both stacks cannot be separately controlled.

Any suitable ceramic fabrication method may be used for forming the SOFCs of the embodiments of the invention. For the ink-printed electrodes, the electrode inks are applied to opposite sides of the electrolyte followed by sintering. The multi-layer structure of described SOFC may be fabricated laminate tape casting of the green ceramic (i.e., where the laminate tape contains the electrode matrix and electrolyte green ceramic). Alternatively, the SOFC can be created by multi layer tape casting. Calendring or roll compaction of multiple layers of tape allows further manipulation of the layer thickness. Other compacting methods, such as uniaxial or isostatic pressing of the tape cast layers, can also be used. The pressing may be performed with or without compatible organic adhesives. The electrode layers 3, 7 may contain pore former material(s) while the electrolyte 5 does not contain pore former material. Any suitable pore former material may be used, such as for example carbon (e.g., graphite, activated carbon, petroleum coke, carbon black or the like), starch (e.g., corn, barley, bean, potato, rice, tapioca, pea, sago palm, wheat, canna, or the like), and/or polymer (e.g., polybutylene, polymethylpentene, polyethylene (such as beads), polypropylene (such as beads), polystyrene, polyamides (nylons), epoxies, ABS, acrylics, polyesters (PET), or the like), as described in U.S. Published Application 2007/0006561, which is incorporated herein by reference. The pore former may comprise about 1 to about 25 weight percent of the green ceramic mixture which also includes the ceramic precursors (i.e., zirconia, scandia, yttria, ceria, etc.), a binder and a solvent. During a subsequent annealing step, such as a burn out, bake out or a sintering step, the pore former material(s) burn out and leave a porous electrode structure, while the middle electrolyte layer in the absence of pore formers becomes dense. Alternatively, the porous outer layers may be deposited after sintering or firing of the middle layer. The outer layers may be sintered or fired at a lower temperature than the middle layer. The outer layers or the interlayers can also be added by methods such as tape casting, screen printing, spin coating, etc. after sintering of the middle electrolyte layer; this addition allows sintering to take place at a lower temperature, thereby expanding the choice of materials.

The electrode and electrolyte layers are preferably sintered together to form a strong structural element. They can be sintered at any suitable temperature, such as a temperature between 1150 and 1400° C. in air. The electrodes are created by infiltrating the appropriate catalyst materials into the two outer porous electrode matrix layers 3, 7 either before and/or after the sintering step. The catalyst materials may be provided in a liquid or slurry form to the electrode matrix layers. Preferably, the infiltration step occurs after the sintering step. Infiltrated electrodes can be subjected to a bake out annealing step at a temperature of 600° C. or less, which is far below cell operating temperature and even further away from ceramic sintering temperatures, thereby avoiding the commonly observed weakening of SOFC when electrodes are applied externally and sintered. Also the reactivity of all materials involved is low at bake out temperature which avoids another common difficulty with conventionally fired electrodes which may form undesirable material phases.

FIG. 7 shows a SOFC 71 in which an electrode (anode or cathode) comprises a porous ceramic layer 73 and wherein the electrolyte comprises a ceramic thin film 75 having a porosity less than that of the porous ceramic layer 73. Together, the porous layer 73 and the thin film 75 comprise a ceramic structure 77. The ceramic structure 77 can be made of any suitable electrolyte material, such as scandia stabilized zirconia (SSZ). The porous layer 73 is preferably thicker than the thin film 75 and imparts structural support to the thin film 75. The porosity and thickness of the porous layer 73 can be tailored to meet the strength requirements of the SOFC 71. For example, the porous layer 73 has a thickness of about 100 µm to about 1000 µm, such as about 200 µm to about 500 µm. The thin film 75 has a thickness less than about 60 µm, such as about 10 µm to about 60 µm, preferably about 20 µm to about 50 µm.

To form an electrode, the porous layer 73 is infiltrated with either an anode material or a cathode material. For example, the porous layer 73 is infiltrated with nickel such that the porous layer comprises an anode electrode. Alternatively, the porous layer is infiltrated with an electrically conductive perovskite material, for example lanthanum strontium manganite (LSM), such that the porous layer 73 comprises a cathode electrode. Infiltration can be performed by depositing a solution of a precursor, such as a catalytic precursor, of the anode or cathode material into the pores of the porous layer 73.

The SOFC 71 also includes a second electrode 79 in contact with the thin film 75 of the structure 77. The second electrode 79 is preferably thinner than the film 75 or porous layer 73. For example, the second electrode 79 may be less than 40 µm thick, such as about 10-30 µm, preferably about 20 µm. The second electrode 79 can be formed either before or after infiltration is performed on the porous layer 73. If the porous layer 73 comprises an anode, then the second electrode 79 comprises a cathode. Alternatively, if the porous layer 73 comprises a cathode, then the second electrode 79 comprises an anode. The second electrode 79 can be deposited using convention methods, such as screen printing. After being deposited on the thin film 79, the second electrode 79 can be sintered either before or after the porous layer 73 is infiltrated with a solution. Sintering can be performed at a temperature of about 1150° C. to about 1400° C. Preferably, only a single sintering step is performed, such that the anode, cathode, and electrolyte are co-sintered at the same time.

An advantage of the SOFC 71 is that it minimizes the orange discoloration associated with degradation of SSZ electrolytes. Preferably, the electrolyte thin film 75 is sufficiently thin to minimize hydrogen diffusion within the electrolyte. Without wishing to be bound to any particular theory, it is believed that orange discoloration of SSZ electrolytes arises at least in part due to hydrogen diffusion and, thus, a reduction in the thickness of the electrolyte tends to decrease degradation and increase operating life. Aside from decreased degradation, the electrolyte thin film 75 of the SOFC 71 exhibits the additional advantage of reducing the ionic resistance of the electrolyte and thereby increasing cell performance.

Figure 8A:
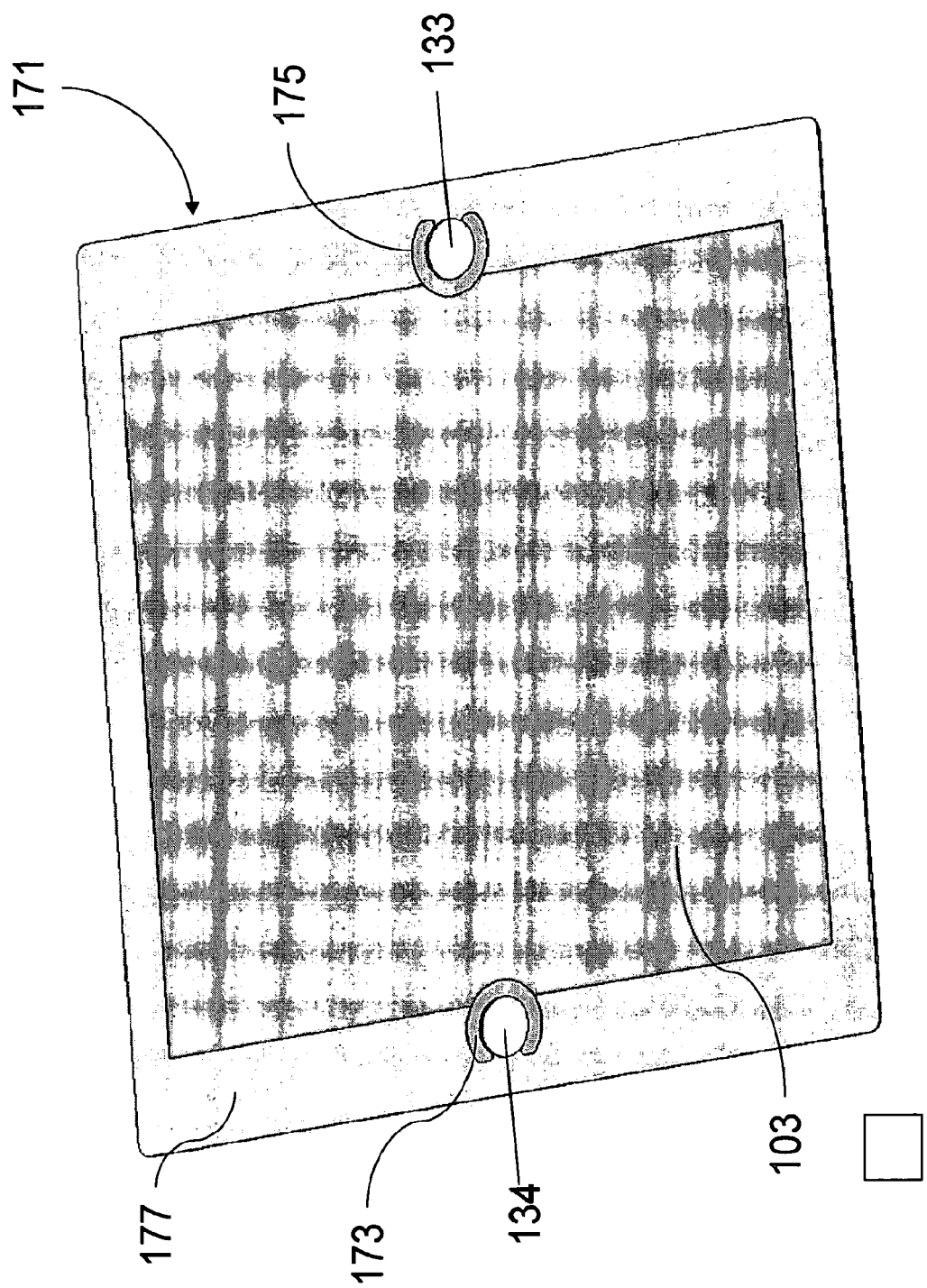
FIG. 8A illustrates a top view of a hole-reinforced electrolyte of a SOFC according to an embodiment of the invention.
Figure 8B:
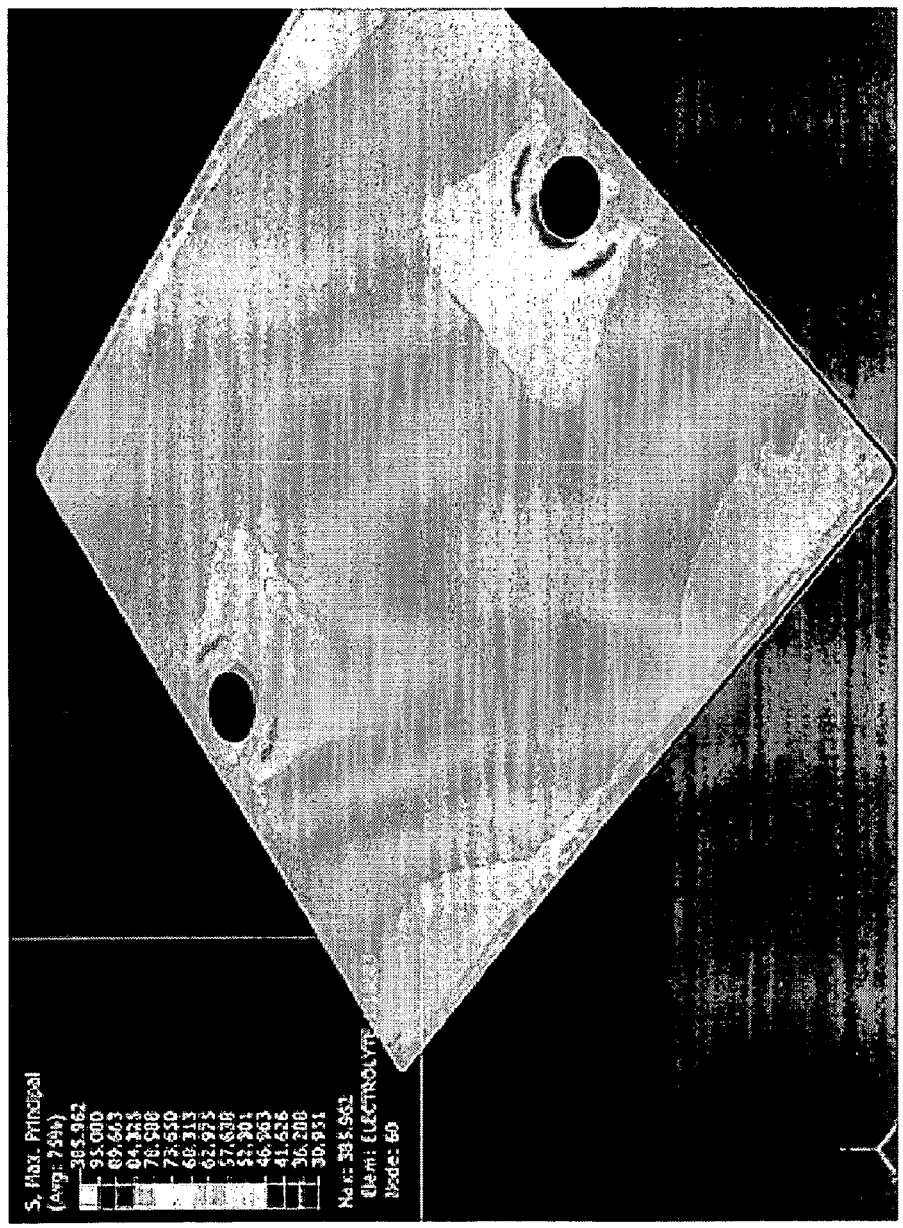
FIG. 8B is a top view computational image of a simulated electrolyte undergoing a thermal load of about 600° C. to about 800° C.

FIG. 8A shows a fuel cell according to an alternative embodiment of the invention. As shown in FIG. 8A, a hole-reinforced electrolyte 171 comprises fuel inlet 133 and outlet 134 riser openings. The riser openings 133, 134 are located on an inactive region 177 of the electrolyte 171, which is located around the periphery of the anode electrode 103. In this embodiment, the anode electrode 103 may be an ink-printed electrode rather than the porous ceramic infiltrated with catalyst material of the previous embodiment or the anode electrode 103 may comprise the porous ceramic infiltrated with catalyst material. Each riser opening also includes ceramic reinforcing regions 173, 175 that are located at least partially around a circumference of each riser opening 133, 134. Preferably, the reinforcing regions 173, 175 provide improved mechanical properties (e.g., fracture strength, hardness, fatigue strength, fatigue, toughness) to the electrolyte 171 in the regions surrounding the riser openings 133, 134 where electrolyte failure is most likely to occur, thereby extending the life of the electrolyte 171. As shown in FIG. 8B, the areas of highest stress have been identified using finite element analysis ("FEA") on a simulated electrolyte undergoing a thermal load of about 600° C. to about 800° C.

As shown in FIG. 8A, the reinforcing regions 173, 175 are located on the inactive region 177 of the electrolyte 171. Preferably, the thickness of the electrolyte plus the ceramic reinforcing region is thicker than that of the portion of the inactive region 177 not containing the ceramic reinforcing region and thicker than the portion of the electrolyte 171 covered by the anode 103. This difference in thickness can be greater than about 25 µm, such as about 25 µm to about 150 µm, for example about 50 µm to about 125 µm. The reinforcing regions 173, 175 can be in the shape of a semicircle, horseshoe, crescent, or U-shaped. Preferably, the reinforcing regions 173, 175 do not form complete circles around the perimeters of the riser opening 133, 134, but are partially open to allow fuel from the anode side to enter and exit the inlet 133 and outlet 134 openings, respectively. The reinforcing regions 173, 175 can be located on either one or both sides of the electrolyte 171. In an embodiment, the reinforcing regions 173, 175 are located only on the anode (top) side of the electrolyte 171, while a seal (not shown) is located on the cathode (bottom) side entirely around the circumference of each riser opening to prevent mixing of fuel and air streams.

The reinforcing regions 173, 175 can be made in a variety of ways. For example, an additional layer of electrolyte material can be laminated and sintered on an electrolyte that has already been fired. The electrolyte is then sintered and solidified. Alternatively, a screen printing technique can be used to provide a ceramic paste (with or without reinforcing fibers and/or particles) onto the electrolyte. If reinforcing fibers or particles are incorporated into the paste, then the materials of the reinforcing phase can be similar or different than that of the base electrolyte substrate. Preferably, the material of the reinforcing phase has a similar coefficient of thermal expansion as that of the base electrolyte substrate, such that cracking due to thermal cycling is minimized. The electrolyte on which the paste is deposited can either be a fired electrolyte or a green tape that has not yet been fired. The green tape can contain the electrolyte, anode, and cathode. In the case of a green tape, the ceramic paste can be co-sintered together with the green tape in order to reduce the number of firing steps used during fuel cell fabrication.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A method of making a hole-reinforced electrolyte, comprising:
   providing a ceramic reinforcing region adjacent to a riser opening in a ceramic electrolyte; and
   sintering the ceramic reinforcing region where the ceramic reinforcing region is located at least partially around a circumference of the riser opening;
   wherein:
   the electrolyte comprises an active region and an inactive region;
   an anode and a cathode contact opposite sides of the electrolyte at least partially on the active region of the electrolyte;
   the ceramic reinforcing region is located on the inactive region of the electrolyte; and
   a combined thickness of the electrolyte and the ceramic reinforcing region is thicker than a thickness of the active region and thicker than a thickness of the inactive region that does not contain the ceramic reinforcing region.

2. The method of claim 1, wherein the step of providing the reinforcing region comprises laminating an additional layer of electrolyte material comprising yttria or scandia onto the electrolyte.

3. The method of claim 1, wherein the step of providing the reinforcing region comprises screen printing a ceramic paste onto the electrolyte.

4. The method of claim 3, wherein the ceramic paste comprises fibers or particles.

5. The method of claim 3, wherein the reinforcing region is screen printed onto a green tape comprising the electrolyte.

6. The method of claim 5, wherein the step of sintering comprises co-sintering the electrolyte, the anode, and the cathode.

7. The method of claim 1, wherein the combined thickness of the electrolyte and the ceramic reinforcing region is about 25 µm to about 150 µm thicker than the thickness of the active region and about 25 µm to about 150 µm thicker than the thickness of the inactive region that does not contain the ceramic reinforcing region.

8. The method of claim 1, wherein the reinforcing region comprises at least one of a semicircle, horseshoe, crescent, or U shape.

9. The method of claim 1, further comprising:
   applying an ink-printed anode and cathode on opposite sides of the electrolyte comprising the sintered ceramic reinforcing region; and
   sintering the ink-printed anode and cathode;
   wherein the step of providing a ceramic reinforcing region comprises screen printing a ceramic paste onto the electrolyte.

* * * * *